United States Patent Office 2,704,740
Patented Mar. 22, 1955

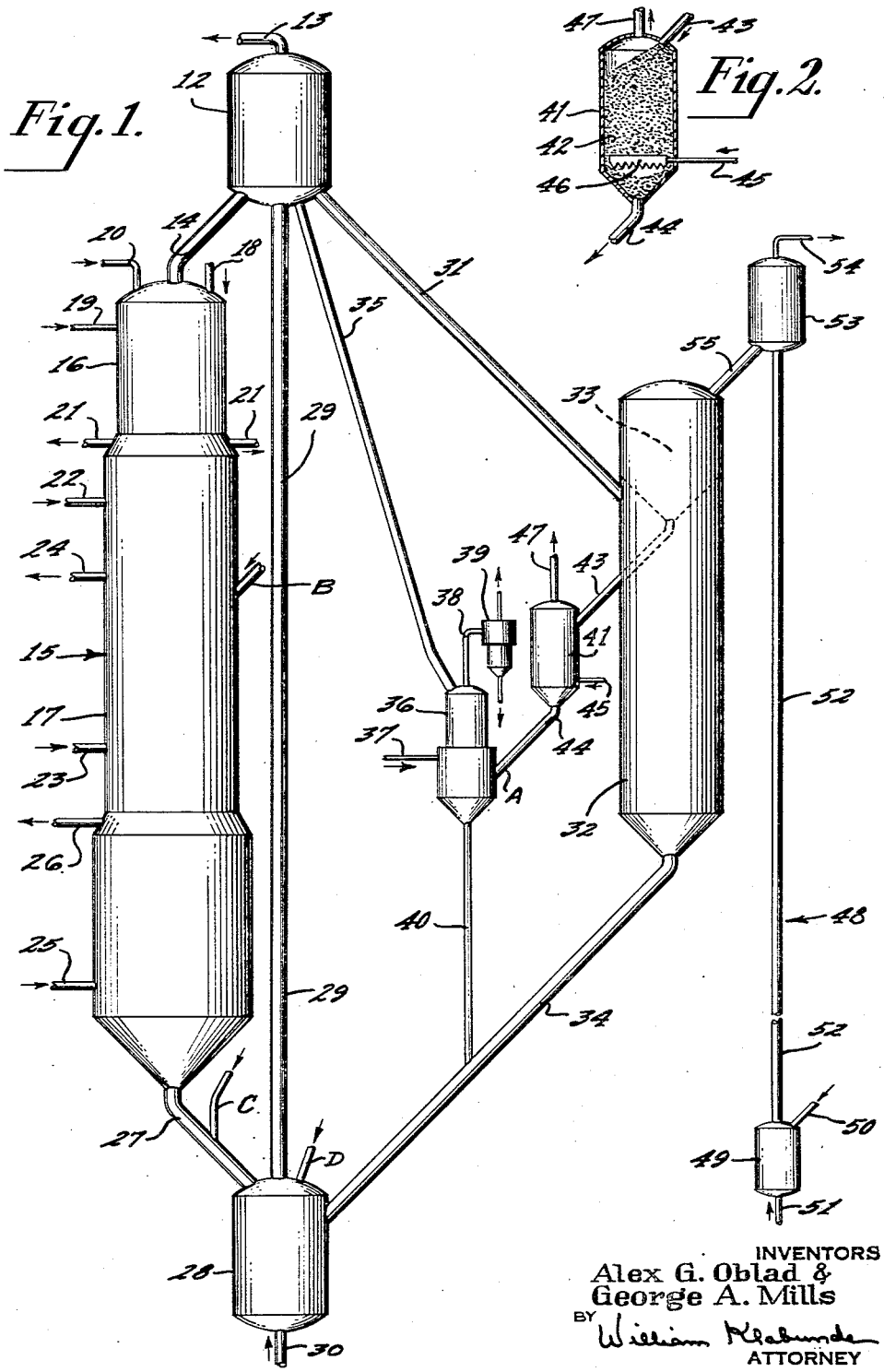

2,704,740
REDUCING CATALYST ATTRITION IN HYDROCARBON CONVERSION SYSTEM

Alex G. Oblad, Springfield, and George Alexander Mills, Swarthmore, Pa., assignors to Houdry Process Corporation, Wilmington, Del., a corporation of Delaware Application December 29, 1950, Serial No. 203,284

1 Claim. (Cl. 196—52)

This invention is concerned with reducing attrition of granular contact material employed in a cyclic hydrocarbon conversion process.

It is of particular application to those systems which involve the continuous circulation of granular contact material capable of adsorbing moisture and, when containing even as little as a few weight percent of moisture, susceptible to breakage and to the formation of internal strains tending to lower its impact resistance if suddenly heated to a relatively high temperature.

Typical of such conversion systems is the catalytic cracking conversion of hydrocarbons to gasoline and other products, in which system hydrocarbons boiling, for example, within the approximate temperature range of 650–1050° F. may be converted in the presence of solid, absorbent catalytic material in the form of beads or pellets. In the conversion, which may be effected at temperatures of about 800° F. or higher, carbonaceous material is deposited as a contaminant on the catalyst, causing a gradual decline in catalytic activity and requiring periodic regeneration. Such regeneration may be effected by combustion in the presence of oxygen-containing gas at temperatures in the range of about 900–1200° F.

The invention is especially applicable to hydrocarbon conversion systems in which granular contact material, such as the spherical bead-type catalyst well known to the art, is continuously circulated through a system having a downflow path including one or more treating zones, through which the contact material gravitates and an upflow path through which the contact material is elevated from the lower end of its downflow path to the upper end thereof. Elevation of the contact material may be effected by pneumatic or mechanical means.

Typical of the systems to which the present invention may be applied is that illustrated and described in an article entitled "Houdriflow: New Design in Catalytic Cracking," appearing at page 78 of the January 13, 1949 issue of the "Oil and Gas Journal." The article discloses, briefly, a catalytic cracking system for the refining of hydrocarbons which comprises an elongated vessel having superimposed reactor and regenerator sections connected to form a downflow path through which catalyst in the form of beads or pellets is passed by gravity flow. The catalyst is supplied to the downflow path from an upper lift hopper disposed at an elevation substantially above the upper end of the vessel, and is withdrawn from the lower end thereof and passed downwardly into a lower lift hopper. The catalyst flowing through the connecting conduits of the downflow path may gravitate as a compact non-turbulent column, and within the chambers of the vessel which form contact zones for engagement of the catalyst with gaseous reactants, the catalyst gravitates in the form of a compact non-turbulent moving bed.

The lower lift hopper provides an introduction chamber, or engaging zone, wherein the catalyst is engaged by a gaseous lift medium and carried thereby into and upwardly through a lift pipe extending from a low point within the introduction chamber upwardly to a point within the upper lift hopper.

In systems involving the circulation of granular contact material, such as catalyst in the form of beads, pellets, etc., one of the serious problems to be overcome is that of degradation of particle size by attrition of the contact material, attrition being defined as fracture and abrasion of the exposed particle surfaces, requiring removal of the attrited particles, in the form of fines, in order to maintain efficient operation of the system. Contributing factors to such catalyst attrition may be the characteristics of flow through the circulatory system, the environment to which it is exposed therein, and the physical characteristics of the catalyst or other contact material.

Catalyst attrition in a cyclic conversion system of the type referred to herein, may be caused by abrasion or by physical impact of the particles of contact material with the surfaces of the confining or flow-directing equipment, especially at points where there is a rapid acceleration of the moving particles, or a change in the direction of flow, and also by severe particle-to-particle contact resulting, for example, from turbulence within the particle stream or from the impact of particles falling freely onto other particles as, for example, a compact bed of the same. It has been noted that the impact caused by catalyst particles colliding with the surfaces of the equipment or with each other tends to chip or wear off surface portions of the material and to fracture the weakest particles. Continued circulation of the fragments results in further breakage or abrasion of the same until the damaged particles are reduced to below the minimum size desired in the circulatory system. The continuous removal of fines from the circulatory system in order to maintain efficient operation of the process and of the circulation system, represents a direct loss of contact mass to the operation. It is therefore an important factor in the overall economics of that operation.

In connection with the matter of attrition, a special problem arises in systems employing catalysts of the dried gel type, in which the homogeneous gel structure is maintained in the final product, such as beads, as opposed to the type of catalyst which comprises particles of ground dried gel agglomerated into granules or pellets. It has been found that when dried gel-type catalyst having an uninterrupted continuous curvilinear surface, commonly such as the known bead catalyst, is employed, and the catalyst beads have an initial or an acquired moisture content of several percent by weight at the time they are introduced, substantially at atmospheric temperature, into a circulatory system operating at elevated temperatures, the sudden drying of the beads at elevated temperatures, hereinafter referred to as thermal shock, causes either immediate breakage or such deterioration of the beads as to make it highly susceptible to attrition in use. When the catalyst is passed in a short time interval from a zone in which it is maintained substantially at atmospheric temperature into a zone of extremely high temperature, so that the catalyst is rapidly raised to the higher temperature, the catalyst is weakened or fractured by the thermal shock, evidently as a consequence of the sudden vaporization of the moisture within the pores thereof. The rapid build-up of pressure within the solid particle resulting from the inability of the vaporized moisture to diffuse through the solid particle at a sufficiently rapid rate causes the particle either to fracture or to be internally strained. Once fractured in this manner, the irregular fragments, even without additional thermal shock thereof, are rapidly attrited by subsequent impacts with other particles and with the surfaces of the equipment. Beads that have become strained are especially subject to breakage upon relatively slight impact.

In circulatory systems, as herein described, the point at which such thermal shock is most likely to occur is the point at which fresh make-up catalyst is added to the system to replace that which has been removed in the form of fines. Since the quantity of make-up catalyst so introduced is usually relatively small in comparison with the total quantity of catalyst being circulated, there is naturally a rapid interchange of heat, so that the make-up catalyst is rapidly raised to a temperature approaching the temperature of the circulating stream to which it is introduced.

In the manufacture of bead catalyst or pelleted agglomerates, the dried material is subjected to calcination or to heat treatment for the purpose of hardening the solid particles, thereby fixing the structure thereof and, in certain instances, stabilizing the catalytic activity. It has been reported that when dried gel-type beads containing moisture in excess of about several percent by weight are heated too rapidly, the beads are considerably weakened and tend to crack or burst as a result of thermal shock. To counteract this tendency, the temperature of such catalyst is slowly raised to a level at which substantially a major portion of the moisture is removed from the beads, and the beads are then subjected to higher temperatures to remove the remaining moisture, or at least the major portion thereof. Generally, such catalyst is obtainable commercially in a relatively dry state, containing less than one percent by weight of physically adsorbed moisture, removable at about 220° F. as distinguished from moisture which is bound up in the structure of the particles and is removable only at elevated temperatures in the order of about 1600° F.

In storing such calcined contact material prior to use, however, it is not unusual for the material to adsorb considerable amounts of moisture. The adsorbed moisture may be obtained directly from the atmosphere, or from the penetration of steam from neighboring apparatus into the catalyst storage vessels, or from steam present in the conveying conduits of the system. Unless unusual precautions are taken, this moisture pick-up by the catalyst in storage is inevitable. It has been found that if ordinary commercial catalyst is permitted to adsorb even relatively small amounts of moisture, for example, in excess of a few percent, prior to its introduction into any high-temperature zone within the circulatory system, despite the fact that the catalyst is already in calcined state from heat treatment during its initial manufacture, the resultant rapid elevation in temperature will cause immediate fracture of the catalyst beads by reason of the thermal shock to which they are subjected, or will produce such internal strains within many of the catalyst particles as to increase the likelihood of their being fractured by particle-to-particle or particle-to-wall impact during use.

In accordance with the present invention, the attrition of catalyst or other adsorbent contact material employed in a cyclic hydrocarbon conversion system is significantly decreased by subjecting the catalyst to a controlled treatment at elevated temperature immediately preceding its introduction into the catalyst circulating system wherein it will encounter high temperatures in the order of 750–1250° F. Such heat treatment is particularly beneficial as applied to dried or plant-calcined spherical bead catalyst having a particle size of 4 to 60 mesh. The heat treatment of the invention is applied to catalyst or other adsorbent contact material, normally introduced as make-up to replace contact material which has been removed, or otherwise eliminated, from the circulatory system. The heat treatment may be effected within the make-up material storage hopper, or at a point along the transfer line which conveys the contact material from the storage hopper to any of a number of suitable points of introduction in the circulatory system, and serves the purpose of removing moisture acquired by the contact material during storage or while being conveyed to the point of introduction. In carrying out the heat treating step, heat is supplied to the contact material at such a rate that all but an insignificant amount of physically adsorbed moisture is removed before the temperature of the contact material exceeds about 250° F., so that vaporized moisture within the pores of the contact material may diffuse therefrom at a rate not substantially lower than the rate of vapor formation. Thereafter, the heat-treated material may be safely introduced at any point in the conversion system, regardless of the temperature at that point.

In a preferred embodiment of the invention, though not so limited, it is proposed to preheat the contact material in a heating zone by contact with hot air, flue gas, or other hot inert gases introduced at a temperature not exceeding about 300° F., the contact material being caused to gravitate as a compact moving bed through the heating zone while the hot gaseous heat exchange medium is passed upwardly through the bed in countercurrent flow relation.

For a fuller understanding of the invention, reference may be had to the accompanying drawing forming a part of this application, in which:

Fig. 1 shows a typical catalytic cracking system for the conversion of hydrocarbons, to which the present invention may be applied; and Fig. 2 is an enlarged sectional elevational view of the fresh catalyst heating chamber installed in the make-up catalyst supply line, the latter, for the purpose of illustrating one application of the invention, being connected to the base of the elutriator.

Referring to Fig. 1 of the drawing, catalyst, such as the silica-alumina bead catalyst well known in the petroleum refining industry, is supplied to the downflow path of the hydrocarbon processing system from an upper lift hopper 12, to which the catalyst has previously been elevated by means of a pneumatic lift. The catalyst is of a size preferably in the range of about three to eight mesh, and may be supplied commercially in a generally dry state, containing, for example, about 0.2 percent by weight of moisture tested on a 220° F. dried basis. Lift hopper 12 includes a disengaging zone or chamber wherein the catalyst is separated from the lift gas, the latter being removed through gas outlet line 13, and the catalyst being continuously withdrawn from the lower end of the lift hopper 12 and passed through a seal leg 14 to the upper end of a processing vessel generally indicated by the numeral 15, comprising an upper reactor section 16 and an expanded lower regenerator section 17.

Hydrocarbons to be converted are introduced into the reactor section 16 of vessel 15 through inlet line 18. Section 16 includes a reaction chamber wherein the hydrocarbon charge is contacted with the catalyst introduced through seal leg 14 to carry out the desired hydrocarbon conversion. Process steam may be introduced into the reaction chamber through inlet line 19, and additional steam, or any other suitable inert gas, may be introduced at the upper end of vessel 15 through inlet line 20 for the purpose of providing a gas seal in the seal leg 14. The catalyst, which has become spent by reason of a carbonaceous deposit formed thereon during the reaction, together with the gaseous products of reaction, pass downwardly by gravity flow from the reaction zone in the lower region of section 16 into a solids-vapor disengager section located in the upper region of the enlarged regenerator section 17, wherein the gaseous reaction products are separated from the spent catalyst. The gaseous reaction products are withdrawn from the vessel 15 through vapor outlets 21. The separated spent catalyst gravitates downwardly through a purging section wherein it is contacted with a stripping gas, such as steam, introduced through inlet 22. The purge steam and the vaporizable material removed from the spent catalyst, together with the separated gaseous material, pass out of the vessel 15 through the vapor outlets 21. From the purging section, the spent catalyst gravitates into the regenerating zone of regenerator section 17. Within the regenerating zone, the spent catalyst passes through successive stages of regeneration. In the upper stage, oxygen-containing gas introduced through inlet 23 passes countercurrently to the flow of catalyst. The gaseous products formed in the upper stage of regeneration are removed from vessel 15 through flue gas outlet 24. From the first stage of regeneration the catalyst gravitates downwardly to the second stage of regeneration, intermediate cooling by indirect heat exchange with a circulating medium being provided, if desired. Oxygen-containing gas is supplied to the lower stage of regeneration through inlet 25, and the gaseous products of regeneration are removed from the upper end of the second regenerating stage through flue gas outlet 26.

At the lower end of vessel 15 the regenerated catalyst is withdrawn through a seal leg 27 and introduced into the upper end of a housing 28 forming the lower lift hopper of a pneumatic lift system. The catalyst is conveyed from the lower lift hopper 28 to the upper lift hopper 12 through a lift pipe 29 by means of a gaseous lift medium, such as flue gas, steam, etc., introduced into lift hopper 28 through inlet 30. Within the lower lift hopper the lift gas engages the catalyst and carries it upwardly through the lift pipe as a continuously moving stream discharging into the upper lift hopper 12.

In addition to the above-described apparatus for carrying out the conversion process and for circulating the catalyst, additional equipment is provided for withdrawing catalyst from the circulating system and storing the same while the unit is shut down for the purposes of inspection, repair or replacement of parts. When the unit is to be shut down, the catalyst is withdrawn from the upper lift hopper 12 through a conduit 31, instead of through seal leg 14, and is passed to a storage hopper 32 of sufficient size to contain all of the catalyst required in the system. Hopper 32 is partitioned internally to provide a small chamber 33 at the upper end for storage of fresh make-up catalyst which is to be periodically introduced into the catalyst circulating system. From storage in hopper 32 the catalyst may be returned to the upper end of the lower lift hopper through conduit 34.

In circulating the catalyst through the system, there is a certain amount of unavoidable catalyst breakage, resulting in the gradual accumulation of minute catalyst particles or fines within the circulating system. Since such fines impair the efficient operation of the processing and catalyst circulating systems, they are continuously removed from the system and replaced with fresh make-up catalyst supplied from storage hopper 33.

To remove the catalyst fines from the circulating system, a stream of catalyst is continuously withdrawn from the lower end of upper lift hopper 12 through conduit 35 and passed into the upper end of an elutriator 36. The elutriator may be of any conventional type suitable for this purpose, in which the catalyst is engaged countercurrently with a stream of gas introduced through inlet line 37. The heavier catalyst particles gravitate to the lower region of elutriator 36, while the fines are carried upwardly by the gas stream and discharged from the upper end of the elutriator through outlet line 38. Line 38 may be connected to a conventional cyclone separator 39 for separating the gas from the fines. From the lower end of elutriator 36 the heavier catalyst particles are withdrawn through conduit 40 and passed into the conduit 34, through which they are then conveyed into the lower lift hopper 28.

Removal of the catalyst fines from the circulating system diminishes the catalyst supply therein, so that replacement with fresh catalyst from hopper 33 is required. Such replacement is not necessarily continuous, but may be made periodically. Preferably the make-up catalyst is gradually added to the circulating system so as not to materially reduce desired operating temperatures as a result of cooling by the lower temperature make-up catalyst. It has been found that make-up catalyst may be added at any of several points in the circulating system, each of which may require the exercise of certain precautions to avoid adverse effects upon the process or the circulating system.

Several of the points at which make-up catalyst may suitably be added to the circulating system are illustrated in Fig. 1 of the drawing. They comprise: (A) the lower region of the elutriator 36; (B) the upper end of the regenerator section 17 of processing vessel 15; (C) the seal leg 27 connecting the lower end of the regenerator section 17 with the upper end of the lower lift hopper 28; and (D) the upper end of the lower lift hopper 28. At each of the foregoing desirable points for adding fresh make-up catalyst suitable inlet conduits are provided. It is to be understood, however, that the make-up catalyst may conveniently be added to the circulating system at points other than those already mentioned.

In practice of the invention, fresh make-up catalyst withdrawn from hopper 33 is first passed to a heater 41 for the purpose of removing all but a small percentage of the moisture contained in the catalyst. The details of heater 41 are shown in the enlarged sectional view of Fig. 2. Heater 41 comprises a vessel adapted to contain a compact bed 42 of catalyst. The catalyst is introduced into the upper end of heater vessel 41 through a conduit 43 connected to the lower end of make-up catalyst hopper 33. The catalyst is withdrawn, as needed, from the lower end of heater 41 through a conduit 44 and passed into the circulating system at any of the suitable points mentioned, such as, A, B, C and D. In Fig. 1 the make-up catalyst is shown as being introduced into the lower region of the elutriator 36, but it is to be understood that the invention is not so limited. When other points of introduction are used, it is contemplated that suitable rearrangement of the apparatus and changes in elevation of the various vessels will be made in order to permit free flow of the catalyst. The catalyst in bed 42 within the heater 41 is heated by direct contact with a hot gaseous heat-exchange medium introduced into the lower region of the bed 42 through inlet line 45 and uniformly distributed over the horizontal cross-sectional area of the bed by conventional means such as the distributor 46. The gaseous heat exchange medium passes upwardly through the bed 42 into the free space in the upper end of the heater 41 and is discharged therefrom through outlet line 47.

Within the heater 41 the fresh make-up catalyst is contacted with gas at a temperature not exceeding 300° F. until the catalyst has attained a temperature of about 250° F. The relative rates of flow of the catalyst and the heating gas are such that the temperature of the catalyst is slowly raised to the desired level, so that all but a relatively small fraction of the moisture in the catalyst is driven off and removed with the gaseous stream through outlet line 47.

While it is recognized that, at times, the fresh make-up catalyst deposited in the hopper 33 will not have a sufficient moisture content to require such preliminary heat treatment, it has nevertheless been found that during storage in the make-up catalyst hopper, and while passing through the conveying conduits, the catalyst often picks up moisture which is normally present in the system. When the moisture content of the catalyst increases to the point where it constitutes several percent by weight of the catalyst, the latter must be dehydrated before it can, without undesirable consequences, be subjected to a rapid and considerable increase in temperature. The heating step of the present invention assures that the catalyst will always be introduced into the circulating system with a minimum moisture content, regardless of whether the catalyst initially contained a high percentage of readily removable absorbed moisture or only such moisture as was acquired after admission to the system.

Since the make-up catalyst hopper 33 is at an elevated position in the system, the fresh catalyst is first raised to the hopper by elevating means, such as the pneumatic lift, generally indicated by the numeral 48. The lift 48 comprises a lower lift hopper 49 into which the catalyst is admitted through conduit 50. Lift gas introduced into lift hopper 49 through inlet 51 engages the fresh make-up catalyst and conveys it upwardly through the lift pipe 52 to the upper lift hopper 53, wherein the catalyst is separated from the gaseous lift medium. The gas is removed overhead from upper lift hopper 53 through an outlet line 54, and the separated catalyst is withdrawn from the lower end of lift hopper 53 and passed to the upper end of make-up catalyst hopper 33 through seal leg 55.

In order to determine the effect of both moisture content and rapid heating of catalyst upon the breakage of catalyst, the following test was made:

Samples of commercially available silica-alumina bead catalyst impregnated with slight amounts of chromium as an oxidation catalyzer and of a particle size in the order of 4 mm. average diameter were exposed at room temperature to air of different relative humidity for the purpose of obtaining samples having a known but different moisture content. The separate samples of known moisture content were then placed in a furnace previously heated to 900° F. The temperature of the beads was raised rapidly to 900° F., the temperature rise in the first minute being from 80° F. to 800° F. The percentage of broken beads was then determined by visual inspection. The test was performed on catalyst beads, as received, containing 26 wt. % of broken beads, and on selected whole beads. The results of the test are shown below in Table I.

*Table 1*

BEADS AS RECEIVED (26.0 WT. PERCENT BROKEN)

| Relative Humidity of Air to Which Beads are Exposed | Ignition Loss [1] (Wt. Percent) | Broken Beads After Thermal Shock (Wt. Percent) |
|---|---|---|
| As received | 1.93 | 27.5 |
| 15% | 1.96 | 30.8 |
| 30% | 3.42 | 32.3 |
| 45% | 5.33 | 25.8 |
| 65% | 5.57 | 31.4 |

SELECTED WHOLE BEADS (0.0 WT. PERCENT BROKEN)

| | | |
|---|---|---|
| 15% | 3.07 | 7.6 |
| 30% | 4.83 | 8.0 |
| 45% | 5.51 | 7.2 |
| 65% | 9.89 | 15.5 |
| 80% | 10.6 | 20.0 |
| 100% | 12.6 | 25.7 |

[1] In the above table, and whenever referred to hereinafter, ignition loss is the weight loss of beads (by ignition at 1600° F. for two hours) divided by the weight of beads prior to ignition, multiplied by 100, and ex------ as percent.

It may be seen from the above data that rapid heating of the catalyst to elevated temperatures causes bead fracture, and that the amount of bead breakage increases with increasing moisture content of the catalyst.

In order to determine the effect of moisture in the catalyst upon breakage as a result of impact, the following test was made:

Samples of the fresh catalyst used in the thermal shock test to obtain the data of Table I were exposed to air of different relative humidity, and were then mildly heat treated in a stream of hot air to reduce the moisture content. The impact attrition of the catalyst was then determined in a ten-cycle run, by discharging the catalyst beads at a velocity of 40 feet per second against a steel plate, and determining the weight percent of broken beads. The results of this test are shown in Table II.

Table II

| Run No. | Heat Treatment, Hrs. to ° F. | | Ignition Loss[1] (Wt. Percent) | Attrition Loss (Wt. Percent) |
|---|---|---|---|---|
| 1 | None | | 12.8 | 8.6 |
| 2 | 23 | 130 | 3.6 | 6.4 |
| 3 | 23 | 175 | 2.6 | 6.7 |
| 4 | 23 | 285 | 1.6 | 6.3 |
| 5 | None | | 3.5 | 6.9 |
| 6 | 24 | 150 | 2.2 | 6.1 |
| 7 | 24 | 210 | 1.6 | 5.8 |
| 8 | 24 | 325 | 0.8 | 5.9 |
| 9 | None | | 12.8 | 8.6 |
| 10 | 7 | 680 | 0.5 | 4.8 |
| 11 | 1/6 | 850 | 1.0 | 4.6 |

The above results indicate that the higher the moisture content of the catalyst, the greater the loss of catalyst by attrition as a result of impact on a steel plate. From these results it may reasonably be assumed that attrition losses by particle-to-particle impact of the beads will likewise be a function of moisture content.

In order to determine the effect of the rate of heating upon the attrition loss of catalyst, the following test was made:

Samples of the bead catalyst referred to in the previous tests were heated to 650° F. in a long time-period of five hours, and in a short period of a few minutes. The catalysts at 650° F. were then subjected to a fifty cycle impact attrition test upon a steel plate, employing 15.6 s. c. f. m. of air to attain a catalyst velocity of 28 feet per second. In calculating the results, allowance was made for the water lost during the runs, so that the attrition figures represent loss of solid material. The results of this test are shown in Table III.

Table III

| Run No. | Ignition Loss[1] | | Heat Treatment Time to 650° F. | Attrition Loss (Wt. Percent) |
|---|---|---|---|---|
| | Original (Wt. Percent) | Final (Wt. Percent) | | |
| 1 | 12.8 | 1.48 | 5 hrs | 16.7 |
| 2 | 12.8 | 1.48 | Few min | 19.8 |
| 3 | 1.9 | 1.0 | 5 hrs | 13.0 |
| 4 | 1.9 | 1.0 | Few min | 18.1 |

In order to determine the effect upon impact, attrition of preheating the bead catalyst to various temperatures over a time-period of ten minutes, the following test was made:

Samples of the bead catalyst, having an initial water content of 12.8 percent by weight more separately placed in a furnace and heated to various temperatures, each heat treatment being over a ten minute period. Air was constantly passed over catalyst during the heating period to remove the water vapor. At the end of the heating period each sample of catalyst was removed from the furnace and the ignition loss determined by heating in a muffle furnace at 1600° F. for two hours. The catalyst was then cooled and given a ten-cycle impact attrition test upon a steel plate, employing 22 s. c. f. m. of air to attain a catalyst velocity of 40 feet per second. The results of this test are shown in Table IV.

Table IV

| Run No. | Max. Temp. (° F.) | Ignition Loss[1] (Wt. Percent) | Attrition Loss (Wt. Percent) |
|---|---|---|---|
| 1 | Atmos. | 12.8 | 8.6 |
| 2 | 250 | 3.59 | 5.7 |
| 3 | 850 | 1.00 | 4.6 |
| 4 | 1,040 | 1.26 | 4.8 |

The above-tabulated results show that the catalyst does not suffer from thermal shock when heated, even to 1040° F., over a ten-minute period. In fact, the cold impact test indicates the impact attrition loss for catalyst heated to 1040° F. over a ten-minute period (4–8 weight percent) is less than that of the original catalyst sample (8.6 weight percent).

A determination of moisture loss from new catalyst beads, initially containing 12.8 weight percent of moisture and exposed to laboratory atmosphere, as a function of temperature, was made by heating the catalyst in a stream of nitrogen. The results are shown in Table V.

Table V

| Temperature (° F.): | Moisture loss (weight percent) |
|---|---|
| 80 | 0 |
| 190 | 10.4 |
| 300 | 12.0 |
| 500 | 12.6 |
| 700 | 12.8 |

The above results show that most of the water is removed from the catalyst by heating to 400–500° F.

In order to determine the effect of bead size upon attrition, a quantity of selected whole beads, which had been exposed to air of 80% relative humidity and showed an ignition loss of 10.6 weight percent, were graded by size into a large bead fraction containing 35% of the example and a small bead fraction containing 65%. The beads were then subjected to the thermal shock test referred to in connection with Table I and the breakage was noted. It was found that the larger bead fraction had a breakage of 54 weight percent, while the smaller bead fraction showed only a 5 weight percent breakage.

From the foregoing series of tests, the following conclusions may be drawn: (1) that the attrition loss is a direct function of the catalyst moisture content; (2) that impact attrition losses for the same catalyst velocity are somewhat higher at elevated temperatures than they are at room temperature; (3) that the rate at which bead catalyst is heated is a more important factor in catalyst attrition than the temperature to which it is heated. Thus, a sample of whole bead catalyst containing 12.8 weight percent of moisture, after being rapidly heated to 900° F. (800° in the first minute) contained about 26% broken beads. The same catalyst when heated to 1040° F. (800° in the first six minutes) showed considerable improvement in attrition characteristics; and (4) the susceptibility to breakage as a result of thermal shock increases with increased bead size.

On the basis of the above-reported data, it is advocated that whenever fresh make-up catalyst, regardless of its moisture content as received, is exposed in storage to an atmosphere conducive to moisture pick-up, such make-up catalyst before being added to the catalyst circulation system of a hydrocarbon conversion unit should be subjected to a slow heat treatment at relatively low temperature, preferably not exceeding at about 250° F., but not exceeding 300° F., until substantially all the readily removable moisture has been driven off.

Obviously many modifications and variations of the invention as hereinbefore set forth may be made without departing from the spirit and scope thereof, and therefore only such limitations should be imposed as are indicated in the appended claim.

What we claim as our invention:

In a hydrocarbon conversion system wherein gel bead catalyst of granular size in continuous circulation is subjected to factors causing attrition and the attrited fines are removed and replaced by such catalyst as fresh catalyst for make-up, which make-up catalyst by reason of its content of physically adsorbed moisture is subject to deleterious fracture and loss of strength by thermal shock when admixed with the hot circulating catalyst in the system, the method of conditioning said make-up catalyst to reduce the deleterious effects of such thermal shock which comprises the steps of: removing all but an insignificant amount of the adsorbed moisture from the make-up catalyst by contact with a flowing stream of hot inert gas having a temperature not exceeding about 300° F., the rate of gas flow and duration of such contact being controlled to effect such moisture removal without raising the temperature of the catalyst to above about 250° F., whereby moisture vaporized within the pores of the catalyst can diffuse therefrom at a rate not substantially lower than that of vapor formation; and introducing the thus obtained moisture-freed make-up catalyst, at its thus attained temperature and without further preheating, directly into admixture with circulating hot catalyst in the system, said circulating catalyst being at a temperature in the range of 750–1250° F.

References Cited in the file of this patent

UNITED STATES PATENTS

| | | |
|---|---|---|
| 2,384,942 | Marisic | Sept. 18, 1945 |
| 2,432,822 | Secor | Dec. 16, 1947 |
| 2,436,254 | Eastwood et al. | Feb. 17, 1948 |
| 2,531,192 | Bergstrom | Nov. 21, 1950 |
| 2,543,005 | Evans | Feb. 27, 1951 |